(12) United States Patent
Kuo et al.

(10) Patent No.: US 12,331,875 B2
(45) Date of Patent: Jun. 17, 2025

(54) FRAME DEVICE

(71) Applicant: InnoLux Corporation, Miao-Li County (TW)

(72) Inventors: Heng-Shen Kuo, Miao-Li County (TW); Yung-Shen Huang, Miao-Li County (TW); I-Han Liu, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 88 days.

(21) Appl. No.: 18/472,658

(22) Filed: Sep. 22, 2023

(65) Prior Publication Data

US 2024/0133514 A1 Apr. 25, 2024
US 2024/0230024 A9 Jul. 11, 2024

(30) Foreign Application Priority Data

Oct. 24, 2022 (CN) .......................... 202211306577.6

(51) Int. Cl.
*F16M 13/00* (2006.01)
*F16M 13/02* (2006.01)

(52) U.S. Cl.
CPC .................................. *F16M 13/02* (2013.01)

(58) Field of Classification Search
CPC ............................ F16M 13/02; H05K 5/0217
See application file for complete search history.

(56) References Cited

U.S. PATENT DOCUMENTS

| | | | | |
|---|---|---|---|---|
| 5,273,511 | A | * 12/1993 | Boeckman | B29C 65/72 493/224 |
| 2012/0321379 | A1 | * 12/2012 | Wang | F16B 5/0642 403/321 |
| 2015/0093179 | A1 | * 4/2015 | Morris | B62D 27/02 403/13 |

FOREIGN PATENT DOCUMENTS

TW 201311110 A 3/2013

* cited by examiner

*Primary Examiner* — Amy J. Sterling
(74) *Attorney, Agent, or Firm* — MUNCY, GEISSLER, OLDS & LOWE, P.C.

(57) ABSTRACT

A frame device includes a back board, a buckle member and a casing. The back board has a groove. The buckle member is disposed on the back board, and has a first part member and the second part member disposed corresponding to the groove, and a distance between the first part member and the second part member varies along a direction. The casing is provided with a hook having a first engaging part and a second engaging part, and a distance between the first engaging part and the second engaging part varies along the direction. The first part member is engaged with the first engaging part, and the second part member is engaged with the second engaging part.

20 Claims, 6 Drawing Sheets

FRAME DEVICE

CROSS-REFERENCE TO RELATED APPLICATIONS

This application claims the benefits of the Chinese Patent Application Serial Number 202211306577.6, filed on Oct. 24, 2022, the subject matter of which is incorporated herein by reference.

BACKGROUND

Field of the Disclosure

The present disclosure relates to a frame device and, more particularly, to a frame device capable of being easily disassembled or assembled.

Description of Related Art

Typically, the mechanical product or electronic product is provided with a frame, and the frame includes a plurality of mechanical parts fixed together. The methods of fixing the mechanical parts include adhesion or screw locking. These fixing methods must use auxiliary components, such as glue or screws, between two mechanical parts to assist the fixing, which causes an increase in production costs. In addition, although it is also possible to fix the mechanical parts by setting hooks on the mechanism parts, the existing hooks have the disadvantage of difficult disassembly or assembly in spite of good fixation, or have the disadvantage of poor fixation in spite of easy disassemble or assemble.

In view of this, there is a need to provide an improved frame device to mitigate and/or obviate the aforementioned problems.

SUMMARY

The present disclosure discloses a frame device. The frame device comprises: a back board having a groove; a buckle member disposed on the back board, and provided with a first part member and a second part member disposed corresponding to the groove, in which a distance between the first part member and the second part member varies along a direction; and a casing having a hook including a first engaging part and a second engaging part, in which a distance between the first engaging part and the second engaging part varies along the direction, wherein the first part member and the first engaging part are engaged with each other, and the second part member and the second engaging part are engaged with each other.

Other novel features of the disclosure will become more apparent from the following detailed description when taken in conjunction with the accompanying drawings.

DETAILED DESCRIPTION OF EMBODIMENT

Figure 1A:
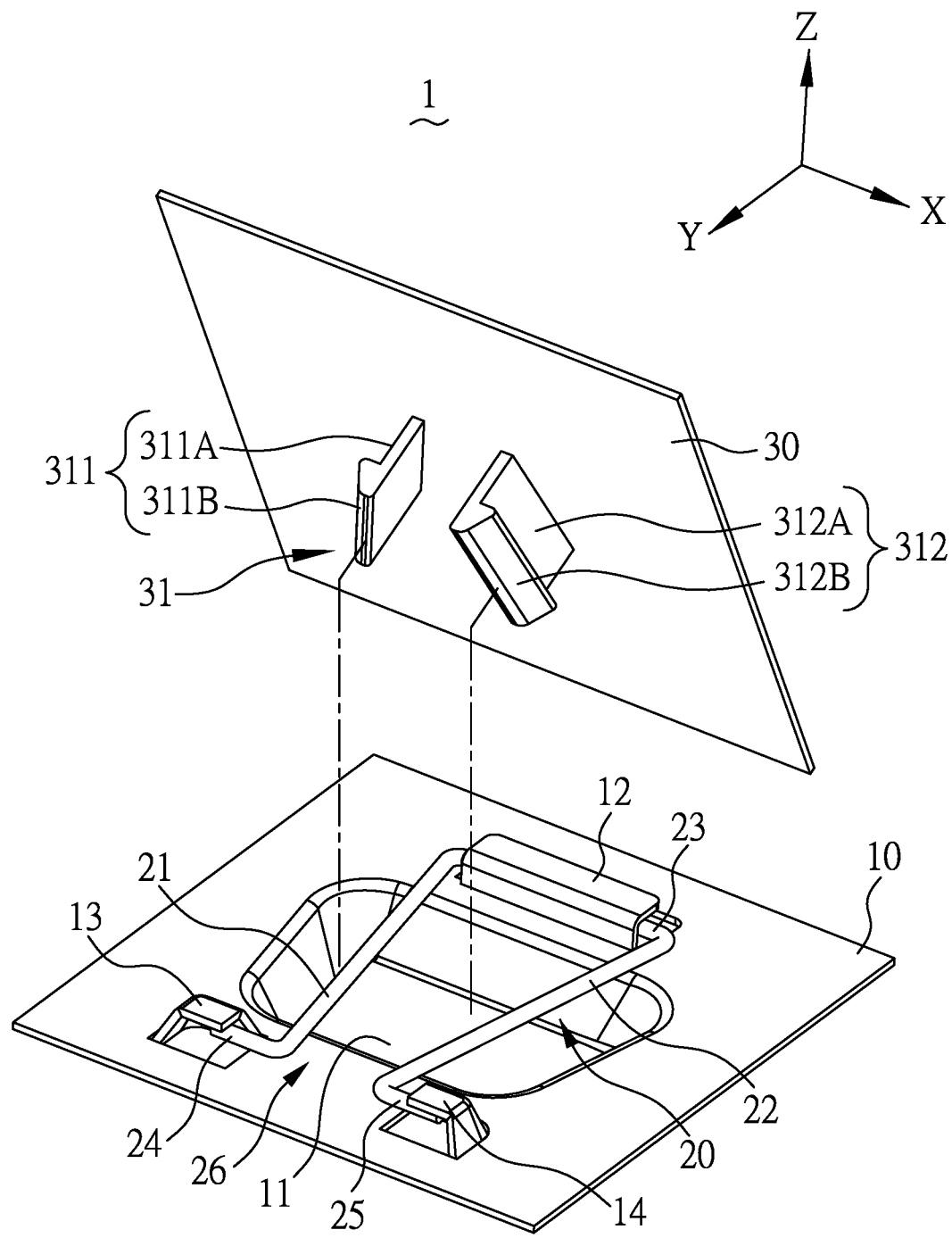
FIG. 1A is an exploded view of the frame device according to an embodiment of the present disclosure.

The implementation of the present disclosure is illustrated by specific embodiments to enable persons skilled in the art to easily understand the other advantages and effects of the present disclosure by referring to the disclosure contained therein. The present disclosure is implemented or applied by other different, specific embodiments. Various modifications and changes can be made in accordance with different viewpoints and applications to details disclosed herein without departing from the spirit of the present disclosure.

It should be noted that, in the specification and claims, unless otherwise specified, having "one" element is not limited to having a single said element, but one or more said elements may be provided. In addition, the description of "at least one of the element (a) and the element (b)" includes an aspect of only the element (a), an aspect of only the element (b), and an aspect of both the element (a) and the element (b).

In addition, in the specification and claims, unless otherwise specified, ordinal numbers, such as "first" and "second", used herein are intended to distinguish components rather than disclose explicitly or implicitly that names of the components bear the wording of the ordinal numbers. The ordinal numbers do not imply what order a component and another component are in terms of space, time or steps of a manufacturing method. A "first" element and a "second" element may appear together in the same component, or separately in different components. The existence of an element with a larger ordinal number does not necessarily mean the existence of another element with a smaller ordinal number.

In addition, the term "adjacent" used herein may refer to describe mutual proximity and does not necessarily mean mutual contact.

In addition, the description of "when . . . " or "while . . . " in the present disclosure means "now, before, or after", etc., and is not limited to occurrence at the same time. In the present disclosure, the similar description of "disposed on" or the like refers to the corresponding positional relationship between the two components, and does not limit whether there is contact between the two components, unless specifically limited. Furthermore, when the present disclosure recites multiple effects, if the word "or" is used between the effects, it means that the effects can exist independently, but it does not exclude that multiple effects can exist at the same time.

In addition, the terms "connect" or "couple" in the specification and claims not only refer to direct connection with another component, but also indirect connection with another component, or refer to electrical connection. Besides, the electrical connection may include a direct connection, an indirect connection, or a mode in which two components communicate through radio signals.

In addition, in the specification and claims, the term "almost", "about", "approximately" or "substantially" usually means within 20%, 10%, 5%, 3%, 2%, 1% or 0.5% of a given value or range. The quantity the given value is an approximate quantity, which means that the meaning of "almost", "about", "approximately" or "substantially" may still be implied in the absence of a specific description of "almost", "about", "approximately" or "substantially". In addition, the terms "ranging from the first value to the second value" and "range between the first value to the second value" indicate that the range includes the first value, the second value, and other values between the first value and the second value.

For convenience of description, unless otherwise specified, "in one direction" referred to hereinafter may represent "approximately or substantially in this direction" or "approximately or substantially in the opposite direction of this direction", while it is not limited thereto. In addition, there may be a deviation between the actual direction and the said direction within about 60 degrees (≤60°), while it is not limited thereto.

In addition, the technical features of different embodiments disclosed in the present disclosure may be combined to form another embodiment.

In addition, the frame device disclosed in the present disclosure may be used in electronic devices or mechanical devices. The electronic device may include a display device, an antenna device, a sensing device, a backlight unit, a touch display device, a curved display device, or a free shape display device, but it is not limited thereto. The electronic device may be a bendable or flexible electronic device. The electronic device may include, for example, liquid crystal, light emitting diode, fluorescence, phosphor, other suitable display media, or a combination thereof, but it is not limited thereto. The light emitting diode may include, for example, an organic light emitting diode (OLED), a sub-millimeter light emitting diode (mini LED), a micro light emitting diode (micro LED) or a quantum dot (QD) light emitting diode (for example, QLED, QDLED) or other suitable materials or a combination thereof, but it is not limited thereto. The display device may include, for example, a tiled display device, but is not limited thereto. The antenna device may be, for example, a liquid crystal antenna, but it is not limited thereto. The antenna device may include, for example, a tiled antenna device, but it is not limited thereto. It should be noted that the electronic device may be a combination of the foregoing, but it is not limited thereto. In addition, the appearance of the electronic device may be rectangular, circular, polygonal, a shape with curved edges, or other suitable shapes. The electronic device may have peripheral systems such as a driving system, a control system, a light source system, a shelf system, etc., to support a display device, an antenna device, or a tiled device. Hereinafter, for the convenience of description, the electronic device will be used below as display device for illustrative purpose only, while the present disclosure is not limited thereto.

For the convenience of description, "extending in a certain direction" as described herein refers to extending along this direction or along the opposite direction of this direction.

The frame device of the present disclosure may include at least two mechanical parts, wherein the type of the mechanical parts may include a casing, a back board, a substrate, a circuit board, etc., while it is not limited thereto. For the convenience of description, in the present disclosure, the frame device including the back board and the casing will be taken as an example.

Figure 1B:
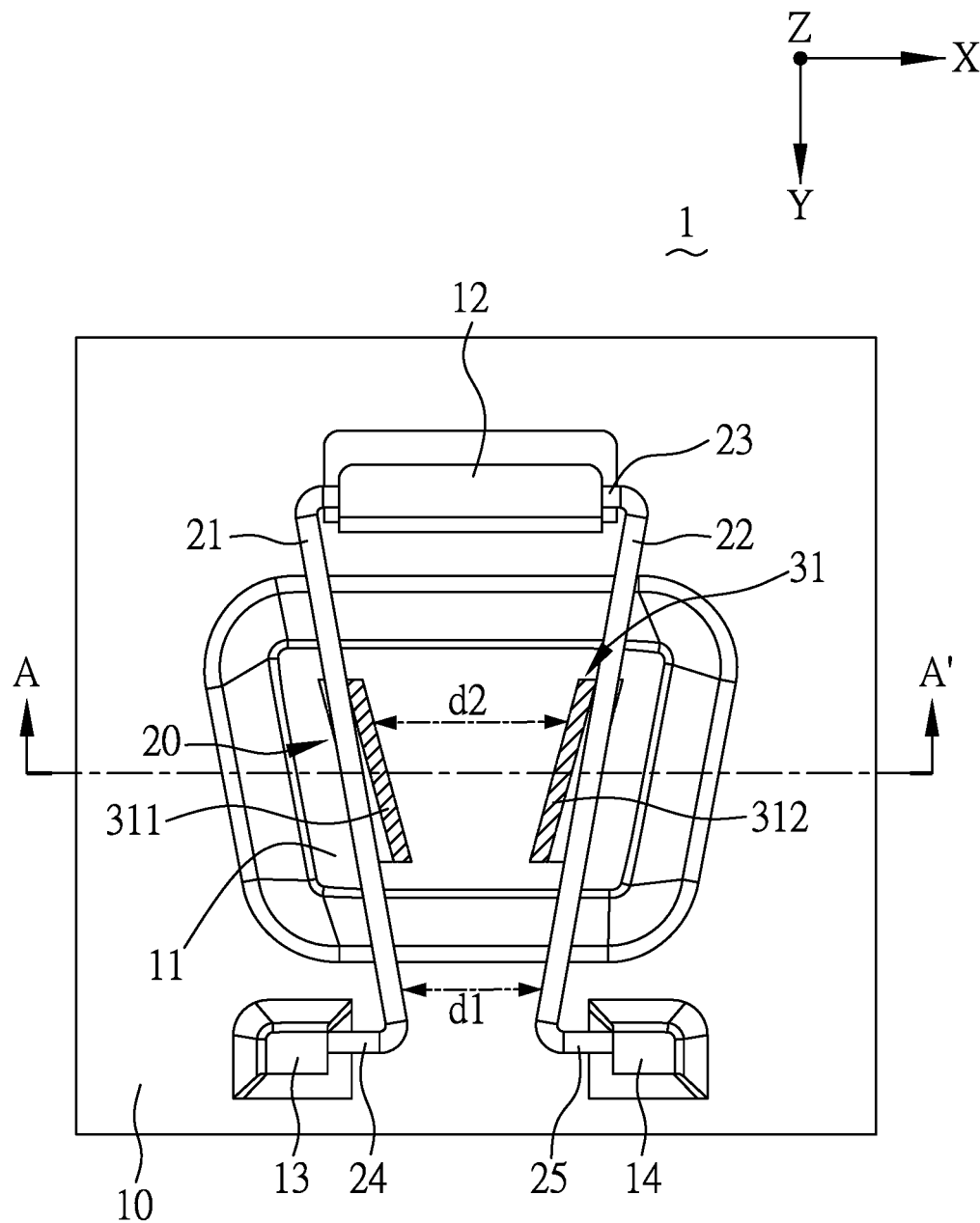
FIG. 1B is a schematic diagram of the frame device according to an embodiment of the present disclosure.
Figure 1C:
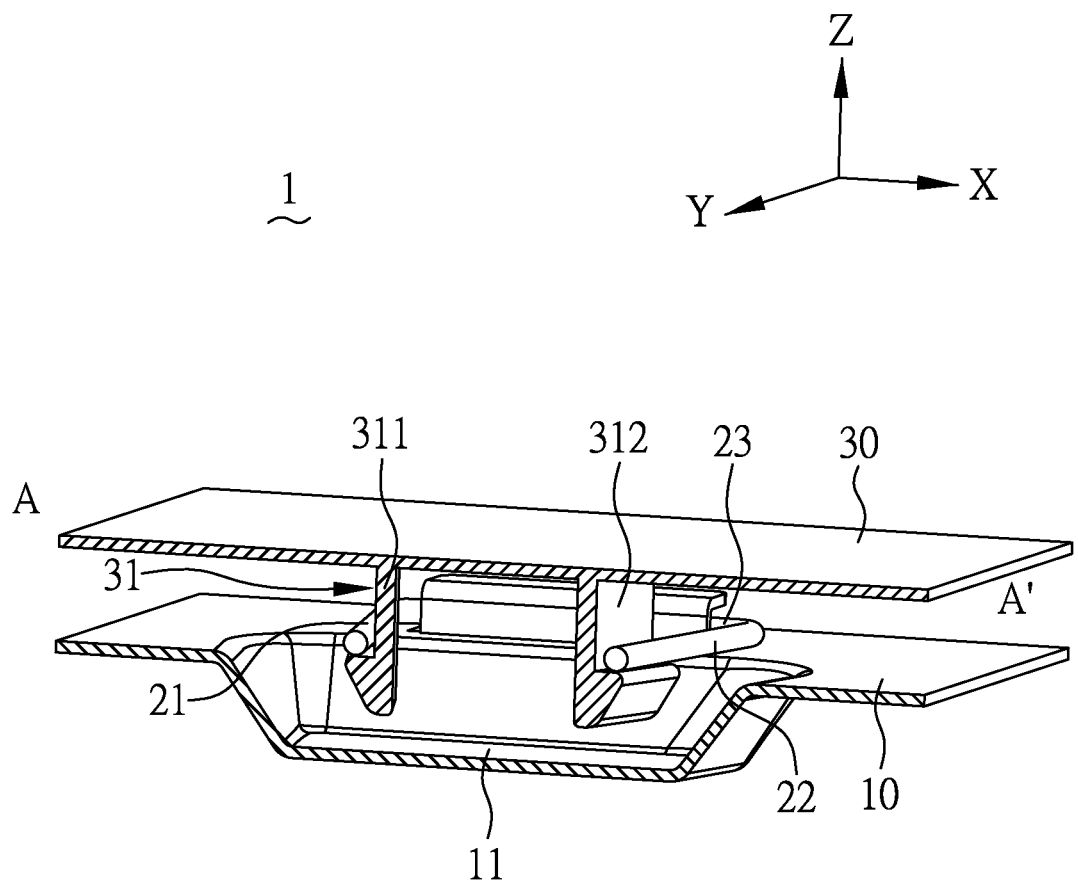
FIG. 1C is a cross-sectional view of the frame device taken along line A-A' of FIG. 1B.

Please refer to FIG. 1A to FIG. 1C. FIG. 1A is an exploded view of the frame device 1 according to an embodiment of the present disclosure, which shows the back plate 10 and the casing 30 of the frame device 1 that are disassembled. FIG. 1B is a schematic diagram of the frame device 1 according to an embodiment of the present disclosure, which shows the back plate 10 and the casing 30 of the frame device 1 that are assembled together in a top view direction and in a perspective view. FIG. 1C is a cross-sectional view of the frame device 1 taken along line A-A' of FIG. 1B, which shows the cross-sectional structure of the back board 10 and the casing 30.

As shown in FIG. 1A to FIG. 1C, the frame device 1 includes a back board 10, a buckle member 20 and a casing 30, wherein the shapes of the back board 10, the buckle member 20 and the casing 30 shown in the drawings are provided for illustrative purpose, and can be adjusted according to the actual needs. The back board 10 has a groove 11. The buckle member 20 may be disposed on the back board 10, for example, may be assembled with the back board 10 or disassembled from the back board 10. The buckle member 20 has a first part member 21 and a second part member 22. The first part member 21 and the second part member 22 are disposed corresponding to the groove 11. In addition, between the first part member 21 and the second part member 22, there is a first distance d1 (marked in FIG. 1B) extending in a first direction (X), wherein the first distance d1 varies along a second direction (Y) perpendicular to the first direction (X), for example, the first distance d1 has different values at different positions in the second direction (Y). The casing 30 has a hook 31, and the hook 31 has a first engaging part 311 and a second engaging part 312. Between the first engaging part 311 and the second engaging part 312, there is a second distance d2 (marked in FIG. 1B) extending in the first direction (X), wherein the second distance d2 also varies along the second direction (Y). As shown in FIG. 1B to FIG. 1C, when the back board 10 is assembled with the casing 30, the first part member 21 of the buckle member 20 may be used to be engaged with the first engaging part 311 of the hook 31, and the second part member 22 of the buckle member 20 may be used to be engaged with the second engaging part 312 of the hook 31.

Next, details of each component will be described.

First, the "back board 10" will be described. The back board 10 may be, for example, a board inside an electronic device or a mechanical device. In one embodiment, the material of the back board 10 may include metal (such as but not limited to iron, copper, aluminum, steel, etc.), alloy, plastic, or a combination thereof, but it is not limited thereto.

In one embodiment, the back board 10 further includes a first locking slot 12, a second locking slot 13 and a third locking slot 14, wherein the second locking slot 13 and the third locking slot 14 are arranged correspondingly in the first direction (X). The first locking slot 12, the second locking slot 13 and the third locking slot 14 protrude from the back board 10. Each of the first locking slot 12, the second locking slot 13 and the third locking slot 14 has an opening. The opening direction of the first locking slot 12 is different from the opening direction of the second locking slot 13 and the opening direction of the third locking slot 14. The opening direction of the second locking slot 13 and the opening direction of the third locking slot 14 are partly the same and partly different. For example, part of the opening direction of the second locking slot 13 and part of the opening direction of the third locking slot 14 all face the second direction (Y), and the other part of the opening direction of the second locking slot 13 and the other part of the opening direction of the third locking slot 14 are opposite to each other in the first direction (X).

Next, the "buckle member 20" will be described. In one embodiment, the material of the buckle member 20 may include metal materials, such as iron, aluminum, carbon steel or stainless steel, but it is not limited thereto.

In one embodiment, the first part member 21 and the second part member 22 are symmetrical in shape, but it is not limited thereto. In one embodiment, the buckle member 20 further includes a third part member 23, a fourth part member 24 and a fifth part member 25. The third part member 23 connects the first part member 21 and the second part member 22, for example, one end of the third part member 23 is connected to the first part member 21, and the other end of the third part member 23 is connected to the second part member 22. The fourth part member 24 is connected to the first part member 21, and the fifth part member 25 is connected to the second part member 22. In one embodiment, the third part member 23, the fourth part member 24 and the fifth part member 25 each extend in the first direction (X), while the first part member 21 extends along one direction different from the first direction (X), and the second part member 22 extends along another direction different from the first direction (X). In addition, the fourth part member 24 extends from the connection between the fourth part member 24 and the first part member 21 toward the opposite direction of the first direction (X), and the fifth part member 25 extends from the connection between the fifth part member 25 and the second part member 22 toward the opposite direction of the first direction (X), so that the buckle member 20 may have an opening 26. Besides, in one embodiment, the first distance d1 between the first part member 21 and the second part member 22 gradually decreases from the position adjacent to the third part member 23 toward the opening 26, but it is not limited thereto.

In one embodiment, the buckle member 20 and the back board 10 may be disassembled from each other or assembled together. In one embodiment, the third part member 23 may be used for being disposed in the first locking slot 12, the fourth part member 24 may be used for being disposed in the second locking slot 13, and the fifth part member 25 may be used for being disposed in the third locking slot 14. Since the buckle member 20 has an opening 26, the first part member 21 and the second part member 22 of the buckle member 20 may be deformed by an external force, so that the first distance d1 between the first part member 21 and the second part member 22 is decreased to facilitate placing the fourth part member 24 and the fifth part member 25 into the second locking slot 13 and the third locking slot 14, or removing the fourth part member 24 and the fifth part member 25 from the second locking slot 13 and the third locking slot 14. Accordingly, the buckle member 20 and the back board 10 may be easily assembled or disassembled.

Next, the "casing 30" will be described. The casing 30 may be, for example, a casing of an electronic device or a mechanical device, such as a back cover or a front cover, etc., while it is not limited thereto. In one embodiment, the material of the casing 30 may include metal (such as but not limited to iron, copper, aluminum, steel, etc.), alloy, plastic, or a combination thereof, but it is not limited thereto.

In one embodiment, the first engaging part 311 and the second engaging part 312 of the hook 31 protrude from the casing 30. As shown in FIG. 1A, in one embodiment, the first engaging part 311 has a first extension part 311A perpendicular to a surface of the casing 30, and a second extension part 311B connected to the first extension part 311A and extending along a direction away from the second engaging part 312. The second engaging part 312 has a first extension part 312A perpendicular to the surface of the casing 30, and a second extension part 312B connected to the first extension part 312A and extending along a direction away from the first engaging part 311. In addition, as shown in FIG. 1B, in one embodiment, the variation of the second distance d2 in the second direction (Y) may correspond to the variation of the first distance d1 in the second direction (Y), for example, the distances gradually decrease along the second direction (Y), but it is not limited thereto.

In addition, as shown in FIG. 1A to FIG. 1C, in one embodiment, when the back board 10 is assembled with the casing 30, the first part member 21 of the buckle member 20 is guided through the second extension part 311B of the first engaging part 311, so that the first part member 21 is engaged into the first engaging part 311 and abuts against the first extension part 311A, and the second part member 22 of the buckle member 20 is guided through the second extension part 312B of the second engaging part 312, so that the second part member 22 is engaged into the second engaging part 312 and abuts against the first extension part 312A, but it is not limited thereto.

In addition, with the shape design of the buckle member 20 and the hook 31, when the hook 31 is engaged with the buckle member 20, the first engaging part 311 and the first part member 21 may have more interference, such as greater engagement force, at a position away from the opening 26, and may have less interference, such as smaller engagement force, at a position near the opening 26. There may be more interference between the second engaging part 312 and the second part member 22 at the position away from the opening 26, and less interference between the second engaging part 312 and the second part member 22 at the position near the opening 26. In one embodiment, between the first engaging part 311 and the first part member 21 (or between the second engaging part 312 and the second part member 22), the engagement force near the third part member 23 is greater than that near the opening 26, so that, when the hook 31 is engaged with the buckle member 20, the buckle member 20 may be slightly displaced along the second direction (Y) thereby making the engagement of the two more stable, but it not limited thereto.

As a result, the frame device 1 of the present disclosure is provided with the effect of being easy to assemble and disassemble. Alternatively, the frame device 1 of the present disclosure has good fixity. Therefore, the problems in the prior art can be solved.

Figure 2:
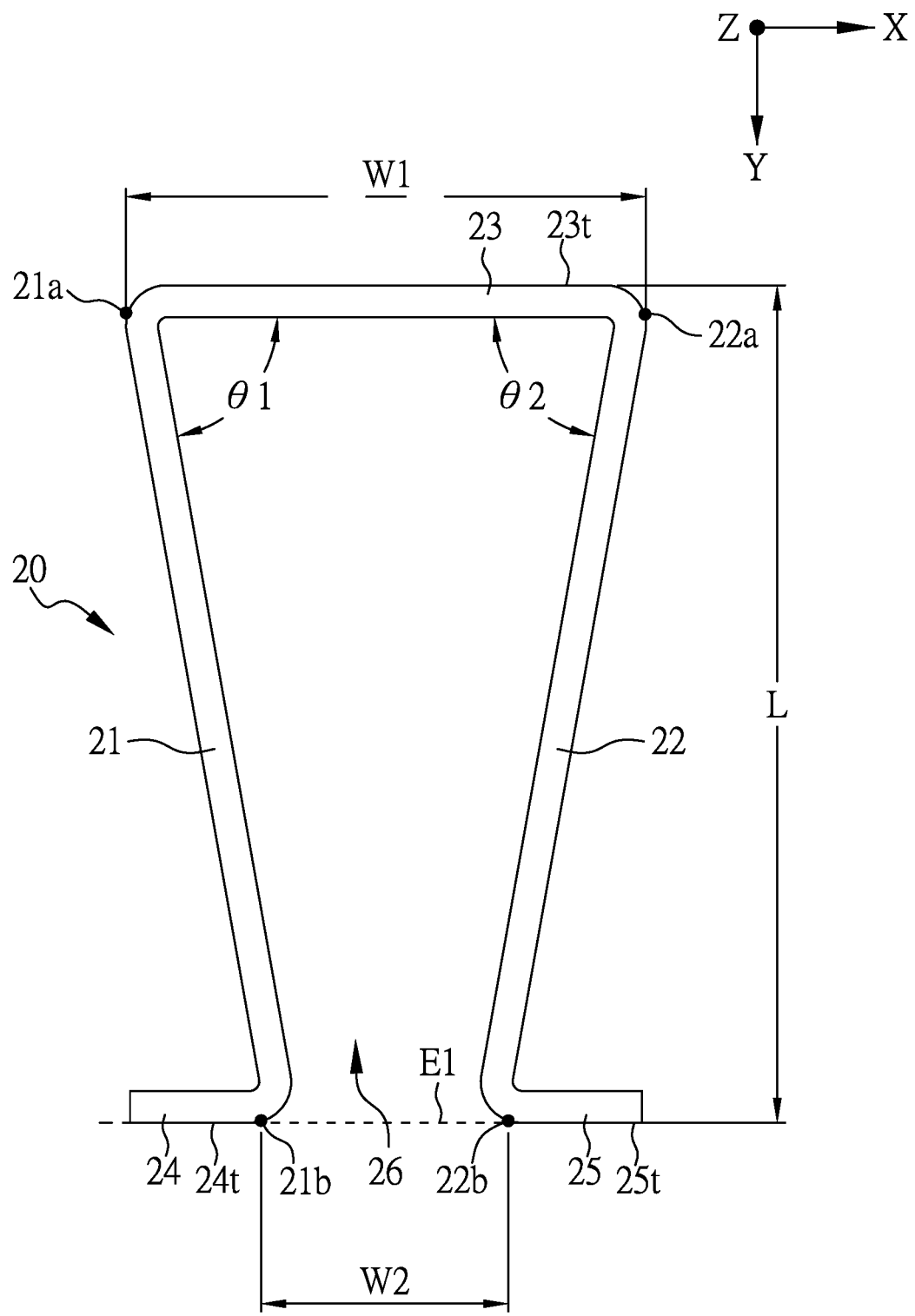
FIG. 2 is a schematic diagram of a buckle member according to a first embodiment of the present disclosure.

The buckle member 20 of the present disclosure may also have different aspects, and then different embodiments of the buckle member 20 will be described. FIG. 2 is a schematic diagram of a buckle member 20 according to the first embodiment of the present disclosure, and please refer to FIG. 1A to FIG. 1D at the same time.

As shown in FIG. 2, the first part member 21 has a first end point 21a adjacent to the third part member 23. The second part member 22 has a second end point 22a adjacent to the third part member 23. In addition, the first part member 21 has a third end point 21b away from the third part member 23, wherein the third end point 21b is adjacent to the fourth part member 24. The second part member 22 has a fourth end point 22b away from the third part member 23, wherein the fourth end point 22b is adjacent to the fifth part member 25. In one embodiment, the first end point 21a and the second end point 22a are disposed at the outer edge of the buckle member 20, and the third end point 21b and the fourth end point 22b are disposed at the inner edge of the buckle member 20, but it is not limited thereto.

In the first direction (X), the distance between the first end point 21a and the second end point 22a may be defined as a first width W1, wherein the first width W1 may be regarded as the maximum distance between the outer edge of the first part member 21 and the outer edge of the second part member 22. In the first direction (X), the distance between the third end point 21b and the fourth end point 22b may be defined as a second width W2, wherein an extension line E1 of the second width W2 in the first direction (X) may overlap an edge 24t of the fourth part member 24 away from the third part member 23, or overlap an edge 25t of the fifth part member 25 away from the third part member 23, but it is not limited thereto. In one embodiment, the first width W1 is greater than the second width W2 (that is, W1>W2). In one embodiment, the ratio of the first width W1 to the second width W2 is greater than or equal to 1.5 (that is, $1.5 \leq W1/W2$). In one embodiment, the ratio of the first width W1 to the second width W2 is greater than or equal to 2 (that is, $2 \leq W1/W2$). In one embodiment, the ratio of the first width W1 to the second width W2 is greater than or equal to 3 (that is, $3 \leq W1/W2$). The aforementioned numerical values are provided for illustrative purpose only, and the present disclosure is not limited thereto.

In one embodiment, the second width W2 is between 10 millimeters (mm) and 20 millimeters ($10 \text{ mm} \leq W2 \leq 20 \text{ mm}$). In one embodiment, the second width W2 is between 11 millimeters and 19 millimeters ($11 \text{ mm} \leq W2 \leq 19 \text{ mm}$). In one embodiment, the second width W2 is between 12 millimeters and 18 millimeters ($12 \text{ mm} \leq W2 \leq 18 \text{ mm}$). In one embodiment, the second width W2 is between 13 millimeters and 17 millimeters ($13 \text{ mm} \leq W2 \leq 17 \text{ mm}$). In one embodiment, the second width W2 is between 14 millimeters and 16 millimeters ($14 \text{ mm} \leq W2 \leq 16 \text{ mm}$). The aforementioned numerical values are provided for illustrative purpose only, and the present disclosure is not limited thereto.

In addition, the third part member 23 has an extension direction (such as the first direction (X)) and, in a direction (such as the second direction (Y)) perpendicular to the extension direction (X), there is a length L between an outer edge 23t of the third part member 23 and the fourth end point 22b (or the third end point 21b). In one embodiment, the ratio of the length L to the second width W2 is between 3 and 6 (that is, $3 \leq L/W2 \leq 6$). In one embodiment, the ratio of the length L to the second width W2 is between 3.5 and 5.5 (that is, $3.5 \leq L/W2 \leq 5.5$). In one embodiment, the ratio of the length L to the second width W2 is between 4 and 5 ($4 \leq L/W2 \leq 5$). The aforementioned numerical values are provided for illustrative purpose only, and the present disclosure is not limited thereto.

In addition, there may be a first included angle $\theta 1$ between the first part member 21 and the third part member 23. In one embodiment, the first included angle $\theta 1$ is between 60 degrees and 89 degrees ($60° \leq \theta 1 \leq 89°$). In one embodiment, the first included angle $\theta 1$ is between 65 degrees and 85 degrees ($65° \leq \theta 1 \leq 85°$). In one embodiment, the first included angle $\theta 1$ is between 70 degrees and 80 degrees ($70° \leq \theta 1) 80°$. There is also a second included angle $\theta 2$ between the second part member 22 and the third part member 23. In one embodiment, the second included angle $\theta 2$ is between 60 degrees and 89 degrees ($60° \leq \theta 2 \leq 89°$). In one embodiment, the second included angle $\theta 2$ is between 65 degrees and 85 degrees ($65° \leq \theta 2 \leq 85°$). In one embodiment, the second included angle $\theta 2$ is between 70 degrees and 80 degrees ($70° \leq \theta 2 \leq 80°$). The aforementioned numerical values are provided for illustrative purpose only, and the present disclosure is not limited thereto.

In addition, as shown in FIG. 2, a direction perpendicular to the first direction (X) and the second direction (Y) is defined as a third direction (Z). In this embodiment, the projection of the first part member 21 or the second part member 22 in the third direction (Z) may be a straight line. The projection of the third part member 23, the fourth part member 24 or the fifth part member 25 in the third direction (Z) may be a straight line or may be a curved line.

Accordingly, the buckle member 20 of the first embodiment can be understood.

Figure 3:
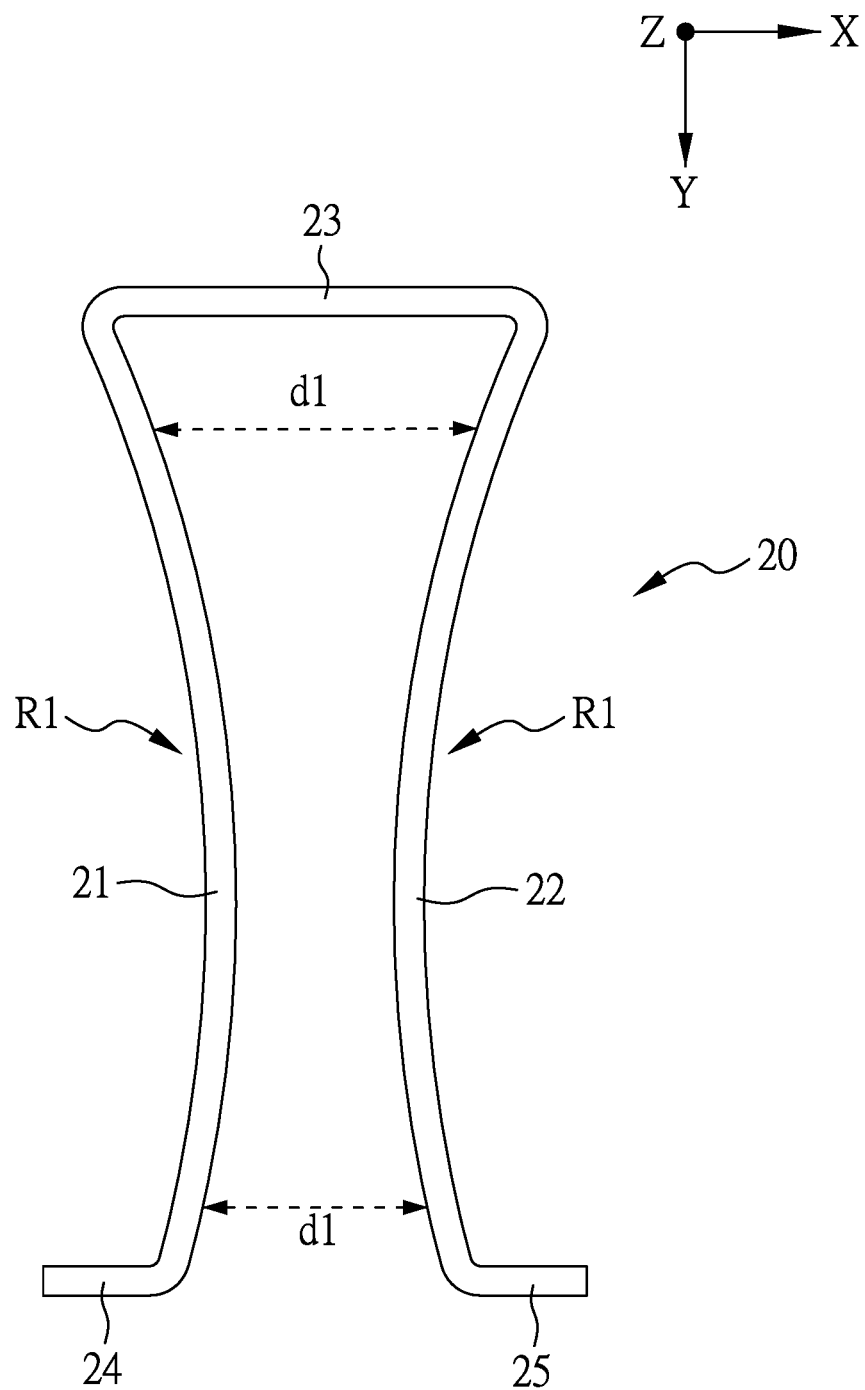
FIG. 3 is a schematic diagram of a buckle member according to a second embodiment of the present disclosure.

FIG. 3 is a schematic diagram of a buckle member 20 according to a second embodiment of the present disclosure, and please refer to FIG. 1A to FIG. 2 at the same time. Most of the features of the second embodiment are applicable to the description of the first embodiment, and thus the following description will mainly focus on the differences.

As shown in FIG. 3, in this embodiment, the projections of the first part member 21 and the second part member 22 in the third direction (Z) may be curved lines. In one embodiment, the first part member 21 may be bent toward the second part member 22, and the second part member 22 may be bent toward the first part member 21. In one embodiment, the first part member 21 and the second part member 22 are symmetrical in shape, but it is not limited thereto. In this embodiment, the first distance d1 between the first part member 21 and the second part member 22 gradually decreases along the position adjacent to the third part member 23 to the bending of the first part member 21 and the second part member 22 in the second direction (Y), and gradually increases along the bending to the opening 26, but it is not limited thereto.

The first part member 21 and the second part member 22 may have a first curvature radius R1. In one embodiment, the first curvature radius R1 is between 20 millimeters and 50 millimeters (that is, $20 \text{ mm} \leq R1 \leq 50 \text{ mm}$). In one embodiment, the first curvature radius R1 is between 22.5 millimeters and 47.5 millimeters (that is, $22.5 \text{ mm} \leq R1 \leq 47.5 \text{ mm}$). In one embodiment, the first curvature radius R1 is between 25 millimeters and 45 millimeters (that is, $25 \text{ mm} \leq R1 \leq 45 \text{ mm}$). The aforementioned numerical values are provided for illustrative purpose only, and the present disclosure is not limited thereto.

Accordingly, the buckle member 20 of the second embodiment can be understood.

Figure 4:
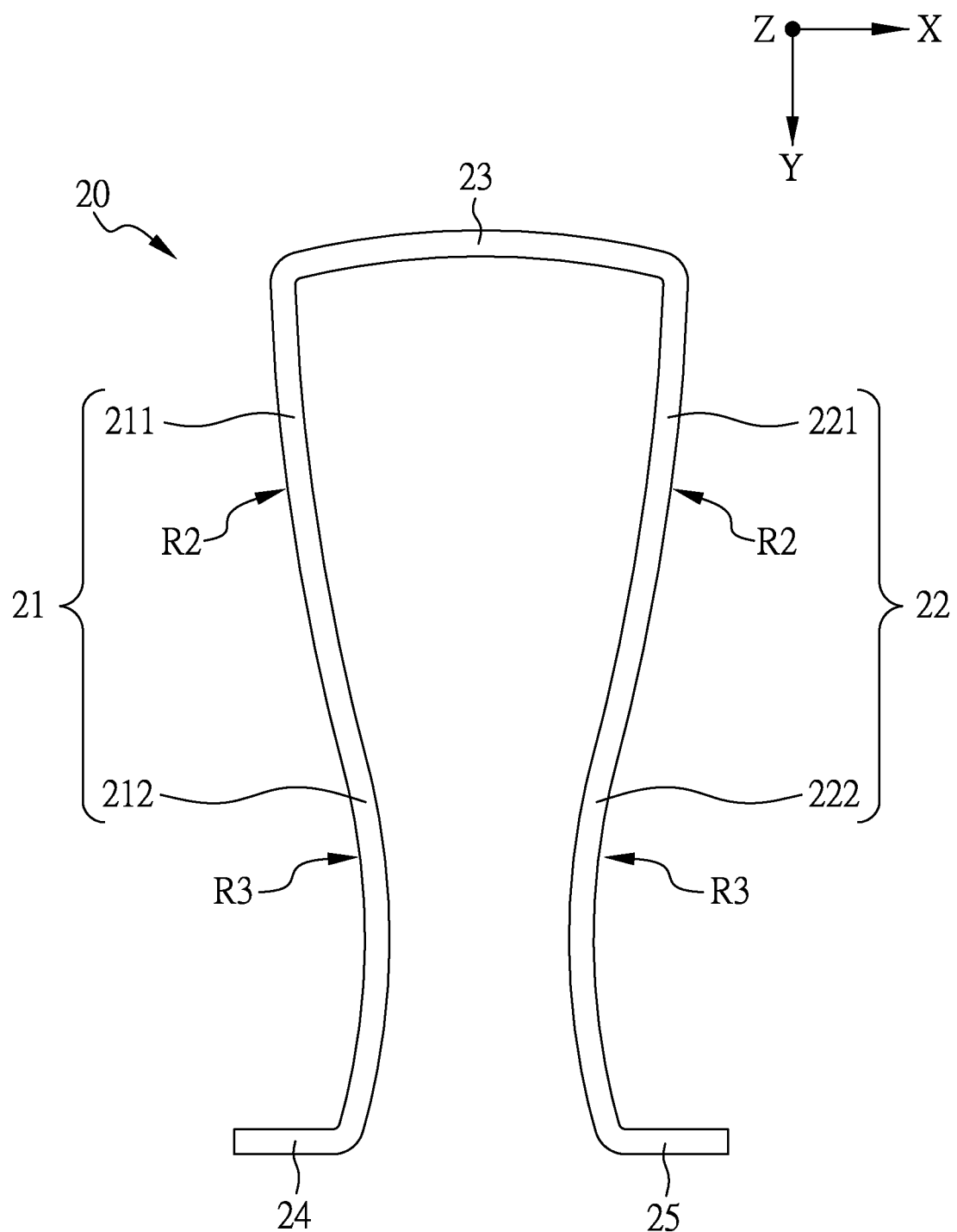
FIG. 4 is a schematic diagram of a buckle member according to a third embodiment of the present disclosure.

FIG. 4 is a schematic diagram of a buckle member 20 according to a third embodiment of the present disclosure, and please refer to FIG. 1A to FIG. 3 at the same time. Most of the features of the third embodiment are applicable to the description of the first embodiment, and thus the following description will mainly focus on the differences.

As shown in FIG. 4, the projection of the first part member 21 of this embodiment in the third direction (Z) may include a plurality of curved lines, and the projection of the second part member 22 in the third direction (Z) may include a plurality of curve lines. For example, the first part member 21 includes a first portion 211 and a second portion 212, wherein the projections of the first portion 211 and the second portion 212 of the first part member 21 in the third direction (Z) may be different curved lines (for example, with different radii of curvature), and the second part member 22 includes a first portion 221 and a second portion 222, wherein the projections of the first portion 221 and the second portion 222 of the second part member 22 in the third direction (Z) may be different curved lines (for example, with different radii of curvature). In addition, the third part member 23 may also be non-linear, but it is not limited thereto. In one embodiment, the first portion 211 of the first part member 21 is bent in a direction away from the second part member 22, the second portion 212 of the first part member 21 is bent toward the second part member 22, and the first portion 221 of the second part member 22 is bent in a direction away from the first part member 21, the second portion 222 of the second part member 22 is bent toward the first part member 21, but it is not limited thereto. In one embodiment, the first part member 21 and the second part member 22 are symmetrical in shape, but it is not limited thereto.

In one embodiment, the first portion 211 of the first part member 21 has a second radius of curvature R2, and the second portion 212 of the first part member 21 has a third radius of curvature R3. In one embodiment, the first portion 221 of the second part member 22 has a second curvature radius R2, and the second portion 222 of the second part member 22 has a third curvature radius R3. In one embodiment, the second curvature radius R2 is different from the third curvature radius R3, but it is not limited thereto.

In one embodiment, the ratio of the second radius of curvature R2 to the third radius of curvature R3 is between 0.8 and 1.2 (that is, $0.8 \leq R2/R3 \leq 1.2$). In one embodiment, the ratio of the second radius of curvature R2 to the third radius of curvature R3 is between 0.85 and 1.15 (that is, $0.85 \leq R2/R3 \leq 1.15$). In one embodiment, the ratio of the second radius of curvature R2 to the third radius of curvature R3 is between 0.9 and 1.1 (that is, $0.9 \leq R2/R3 \leq 1.1$). The aforementioned numerical values are provided for illustrative purpose only, and the present disclosure is not limited thereto.

In one embodiment, the second radius of curvature R2 is between 20 millimeters and 50 millimeters (that is, 20 mm$\leq$R2$\leq$50 mm). In one embodiment, the second radius of curvature R2 is between 25 millimeters and 45 millimeters (that is, 25 mm$\leq$R2$\leq$45 mm). In one embodiment, the second radius of curvature R2 is between 30 millimeters and 40 millimeters (that is, 30 mm$\leq$R2$\leq$40 mm). The aforementioned numerical values are provided for illustrative purpose only, and the present disclosure is not limited thereto.

Accordingly, the buckle member 20 of the third embodiment can be understood.

In one embodiment, the present disclosure may at least compare the frame device 1 with an object through the observation of the mechanism, for example, use the presence or absence of components and/or the arrangement of components as proof of whether the object falls within the scope of patent protection of the present disclosure, while it is not limited thereto.

As a result, the back board 10 and the buckle member 20 of the frame device 1 of the present disclosure may be easily assembled or disassembled. Alternatively, the hook 31 of the frame device 1 may be firmly engaged with the buckle member 20. Therefore, the present disclosure may solve the problems of the prior art.

The details or features of the various embodiments disclosed in the present disclosure may be mixed and matched as long as they do not violate the spirit of disclosure or conflict with each other.

The aforementioned specific embodiments should be construed as merely illustrative, and not limiting the rest of the present disclosure in any way.

The invention claimed is:

1. A frame device, comprising:
a back board having a groove;
a buckle member disposed on the back board, and provided with a first part member and a second part member disposed corresponding to the groove, wherein a distance between the first part member and the second part member varies along a direction; and
a casing having a hook including a first engaging part and a second engaging part,
wherein a distance between the first engaging part and the second engaging part varies along the direction, wherein the first part member and the first engaging part are engaged with each other, and the second part member and the second engaging part are engaged with each other.

2. The frame device as claimed in claim 1, wherein the buckle member further has a third part member that connects the first part member and the second part member.

3. The frame device as claimed in claim 2, wherein there is an included angle between the third part member and the first part member, and the included angle is between 60 degrees and 89 degrees.

4. The frame device as claimed in claim 2, wherein there is an included angle between the third part member and the second part member, and the included angle is between 60 degrees and 89 degrees.

5. The frame device as claimed in claim 2, wherein the first part member has a first end point adjacent to the third part member, the second part member has a second end point adjacent to the third part member, a distance between the first end point and the second end point is defined as a first width, the first part member has a third end point away from the third part member, the second part member has a fourth end point away from the third part member, a distance between the third end point and the fourth end point is defined as a second width, and the first width is greater than the second width.

6. The frame device as claimed in claim 5, wherein the ratio of the first width to the second width is greater than or equal to 1.5.

7. The frame device as claimed in claim 5, wherein the third part member has an extension direction and, in a direction perpendicular to the extension direction, a distance between the third part member and the fourth end point is a length, in which a ratio of the length to the second width is between 3 and 6.

8. The frame device as claimed in claim 5, wherein the second width is between 10 millimeters and 20 millimeters.

9. The frame device as claimed in claim 1, wherein the first part member has a first radius of curvature, and the first radius of curvature is between 20 millimeters and 50 millimeters.

10. The frame device as claimed in claim 1, wherein the second part member has a first portion and a second portion, the first portion has a second radius of curvature, the second portion has a third radius of curvature, and the second radius of curvature is different from the third radius of curvature.

11. The frame device as claimed in claim 10, wherein a ratio of the second radius of curvature to the third radius of curvature is between 0.8 and 1.2.

12. The frame device as claimed in claim 10, wherein the second radius of curvature is between 20 millimeters and 50 millimeters.

13. The frame device as claimed in claim 2, wherein the buckle member further comprises a fourth part member and a fifth part member, the fourth part member is connected to the first part member, and the fifth part member is connected to the second part member.

14. The frame device as claimed in claim 13, wherein the back board further comprises a first locking slot, a second locking slot and a third locking slot, wherein the third part member is used to be disposed in the first locking slot, the fourth part member is used to be disposed in the second locking slot, and the fifth part member is used to be disposed in the third locking slot.

15. The frame device as claimed in claim 13, wherein the first engaging part has a first extension part perpendicular to a surface of the casing and a second extension part connected to the first extension part and extending along a direction away from the second engaging part, and the second engaging part has a first extension part perpendicular to the surface of the casing, and a second extension part connected to the first extension part and extending along a direction away from the first engaging part.

16. The frame device as claimed in claim 1, wherein the buckle member has an opening opposite to the third part member, and the distance between the first part member and the second part member gradually decreases from a position adjacent to the third part member toward the opening.

17. The frame device as claimed in claim 1, wherein variation of the distance between the first engaging part and the second engaging part in the second direction corresponds to variation of the distance between the first part member and the second part member in the second direction.

18. The frame device as claimed in claim 9, wherein the first part member is bent toward the second part member.

19. The frame device as claimed in claim 3, wherein a projection of the third part member is a curved line.

20. The frame device as claimed in claim 10, wherein the first portion of the second part member is bent in a direction away from the first part member, and the second portion of the second part member is bent toward the first part member.

* * * * *